US011884071B2

(12) United States Patent
Giusti et al.

(10) Patent No.: US 11,884,071 B2
(45) Date of Patent: Jan. 30, 2024

(54) FLUID EJECTION DEVICE WITH REDUCED NUMBER OF COMPONENTS, AND METHOD FOR MANUFACTURING THE FLUID EJECTION DEVICE

(71) Applicant: STMICROELECTRONICS S.r.l., Agrate Brianza (IT)

(72) Inventors: Domenico Giusti, Caponago (IT); Carlo Luigi Prelini, Seveso (IT); Lorenzo Tentori, Verano Brianza (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 11 days.

(21) Appl. No.: 17/572,374

(22) Filed: Jan. 10, 2022

(65) Prior Publication Data

US 2022/0126580 A1 Apr. 28, 2022

Related U.S. Application Data

(62) Division of application No. 16/848,549, filed on Apr. 14, 2020, now Pat. No. 11,260,659.

(30) Foreign Application Priority Data

Apr. 15, 2019 (IT) ........................ 102019000005794

(51) Int. Cl.
*B41J 2/14* (2006.01)
*B41J 2/165* (2006.01)

(52) U.S. Cl.
CPC ......... *B41J 2/14201* (2013.01); *B41J 2/1433* (2013.01); *B41J 2/1652* (2013.01)

(58) Field of Classification Search
CPC .... B41J 2/14201; B41J 2/1433; B41J 2/1652; B41J 2002/1437; B41J 2/1623;
(Continued)

(56) References Cited

U.S. PATENT DOCUMENTS

2010/0073435 A1 3/2010 Miyazawa et al.
2017/0182778 A1 * 6/2017 Cattaneo ................ B41J 2/1629
(Continued)

FOREIGN PATENT DOCUMENTS

CN 1841802 A 10/2006
CN 103619599 A 3/2014
(Continued)

*Primary Examiner* — Lisa Solomon
(74) *Attorney, Agent, or Firm* — Seed IP Law Group LLP

(57) ABSTRACT

Various embodiments provide an ejection device for a fluid. The ejection device includes a first semiconductor wafer, housing, on a first side thereof, a piezoelectric actuator and an outlet channel for the fluid alongside the piezoelectric actuator; a second semiconductor wafer having, on a first side thereof, a recess and, on a second side thereof opposite to the first side, at least one inlet channel for said fluid fluidically coupled to the recess; and a dry-film coupled to a second side, opposite to the first side, of the first wafer. The first and the second wafers are coupled together so that the piezoelectric actuator and the outlet channel are set directly facing, and completely contained in, the recess that forms a reservoir for the fluid. The dry-film has an ejection nozzle.

20 Claims, 9 Drawing Sheets

(58) Field of Classification Search
CPC ...... B41J 2/14233; B41J 2/161; B41J 2/1626; B41J 2/1631; B41J 2/1632; B41J 2/01; B41J 2/162; B41J 2/1621; B41J 2/1628; B41J 2/1629; B41J 2002/14258
See application file for complete search history.

(56) References Cited

U.S. PATENT DOCUMENTS

| | | | |
|---|---|---|---|
| 2018/0154635 | A1 | 6/2018 | Nakakubo |
| 2018/0297357 | A1 | 10/2018 | Menzel et al. |

FOREIGN PATENT DOCUMENTS

| | | | |
|---|---|---|---|
| CN | 104512114 | A | 4/2015 |
| CN | 106926582 | A | 7/2017 |
| CN | 109278407 | A | 1/2019 |
| CN | 212499504 | U | 2/2021 |
| EP | 1089360 | A1 | 4/2001 |
| EP | 3381690 | A1 | 10/2018 |
| EP | 3431295 | A1 | 1/2019 |

* cited by examiner

FLUID EJECTION DEVICE WITH REDUCED NUMBER OF COMPONENTS, AND METHOD FOR MANUFACTURING THE FLUID EJECTION DEVICE

BACKGROUND

Technical Field

The present disclosure relates to fluid ejection devices.

Description of the Related Art

Fluid ejection devices are often used for ink-jet heads for printing applications. Printheads of this sort, with appropriate modifications, can likewise be used for ejecting fluids other than ink, for example, for applications in the biological or biomedical field, for local application of biological material (e.g., DNA) in the manufacture of sensors for biological analyses, for the decoration of fabrics or ceramics, and in applications of 3D printing and additive production.

Manufacturing methods for fluid ejection devices often envisage coupling via gluing or bonding of a large number of pre-machined components; typically, the various components are manufactured separately and assembled in a final production step. A printhead is typically formed by a large number of fluid ejection devices (of the order of hundreds or thousands), each of which includes a nozzle, a chamber for containing the fluid coupled to the nozzle, and an actuator coupled to the chamber, for causing outlet of the fluid through the respective nozzle. It is desirable for each of the fluid ejection devices belonging to a printhead to be as identical as possible to the other fluid ejection devices belonging to the same printhead, to guarantee uniformity of performance, above all in terms of volume of the fluid ejected and ejection rates.

The method of assembly of the aforementioned pre-machined components proves costly and involves high precision; the resulting device moreover presents a large thickness.

For instance, U.S. Patent Application Publication No. 2017/182778 discloses a method for manufacturing a fluid ejection device that envisages coupling of three wafers at least in part pre-machined. The method described envisages coupling steps (e.g., using bonding techniques) that involves a high degree of accuracy in order to obtain a good alignment between the wafers and between the functional elements obtained therein. Moreover, formation of the actuation membrane of the ejection device (to which the piezoelectric actuator is coupled) envisages an etching step via which the area of the suspended portion of the membrane is defined. It is evident that devices manufactured at different times and/or with different machinery may be subject to undesired variations of the size of the aforesaid suspended area, with the risk of jeopardizing reproducibility of the ejection device.

BRIEF SUMMARY

Various embodiments of the present disclosure provide a method for manufacturing a fluid ejection device, and a fluid ejection device, that overcome the drawbacks of the prior art. The fluid ejection device is based upon piezoelectric technology, and includes two wafers of semiconductor material machined and coupled together.

According to one embodiment, the fluid ejection device is fabricated by forming a first wafer and a second wafer. A piezoelectric actuator is formed on a first side of the first wafer, and an outlet channel is formed in the first wafer and lateral to the piezoelectric actuator. A recess and at least one inlet channel fluidically coupled to the recess are formed in the second wafer. The first wafer and the second wafer are coupled together such that the piezoelectric actuator faces and is in the recess, and the recess forms a reservoir configured to hold fluid. A nozzle plate is coupled to a second side, opposite to the first side, of the first wafer. An ejection nozzle, at least partially aligned with the outlet channel, is formed through the nozzle plate such that the ejection nozzle is fluidically coupled to the recess through the outlet channel.

BRIEF DESCRIPTION OF THE SEVERAL VIEWS OF THE DRAWINGS

For a better understanding of the present disclosure, various embodiments thereof are now described, purely by way of non-limiting example, with reference to the attached drawings, wherein.

DETAILED DESCRIPTION

Figure 1:
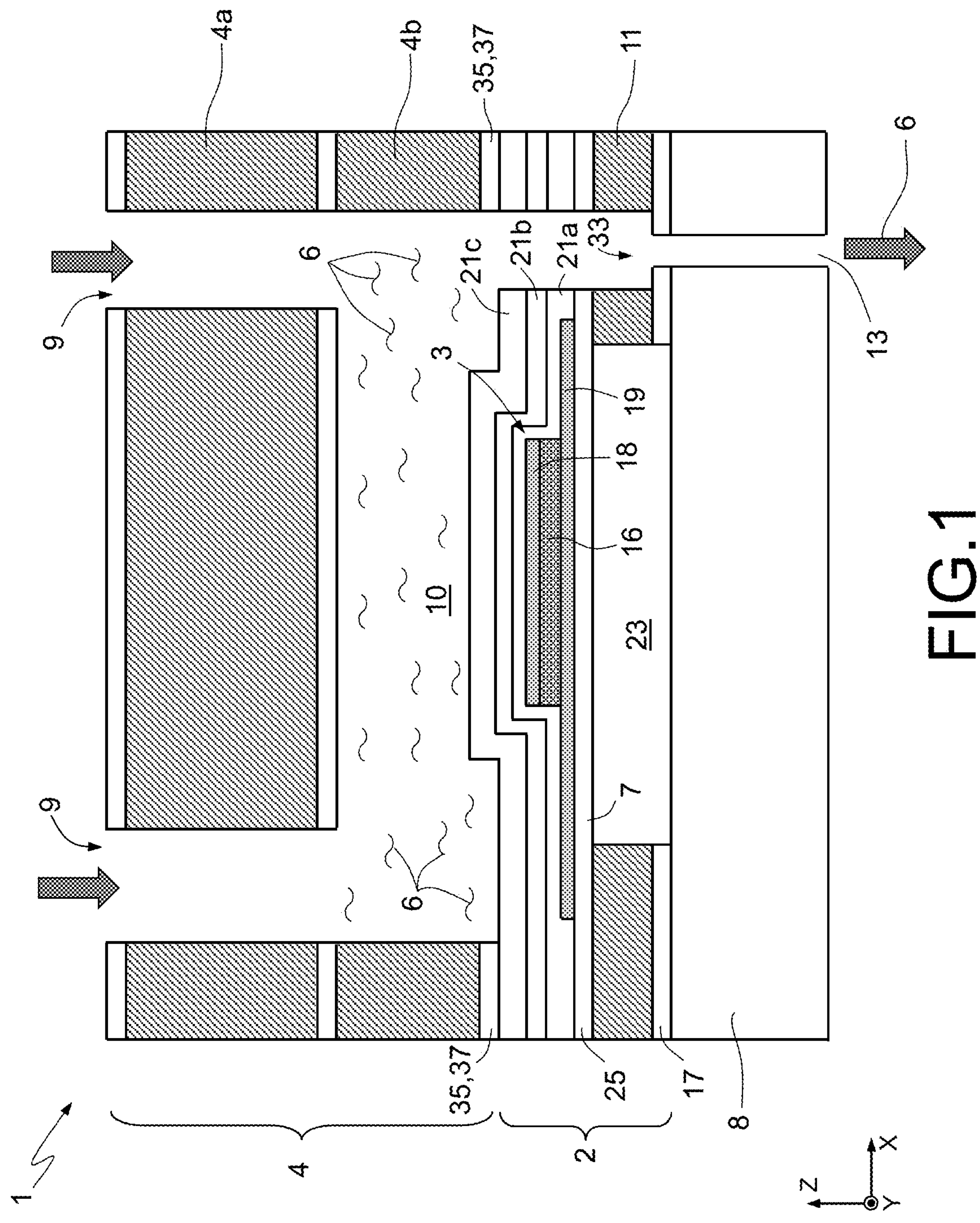
FIG. 1 shows, in side cross-section view, a fluid ejection device obtained according to a method forming the subject of the present disclosure.

With reference to FIG. 1, a fluid ejection device 1 is illustrated according to an aspect of the present disclosure. FIG. 1 is a side cross-section view, taken along a plane XZ of a triaxial Cartesian system X, Y, Z.

With reference to FIG. 1, a first wafer 2, including a structural layer 11 of semiconductor material, is machined so as to form thereon one or more piezoelectric actuators 3, adapted to be controlled to generate a deflection of (i.e., move) a membrane 7. Deflection of the membrane 7 causes a variation in the internal volume of one or more respective chambers 10 adapted to define respective reservoirs for containing a fluid 6 to be expelled during use through an outlet channel 33. FIG. 1 shows by way of example an individual chamber 10 coupled to an individual actuator 3.

A second wafer 4 is machined so as to define the volume of the chamber 10 and so as to form one or more inlet holes 9 for the fluid 6, in fluidic connection with the chambers 10. FIG. 1 illustrates two inlet holes 9 (one of which can be used as recirculation channel). However, there may be present just one inlet hole 9.

As will be discussed in further detail below, each of the first wafer 2 and the second wafer 4 is a multilayer structure including various sub layers.

In the embodiment illustrated, the second wafer 4 includes a substrate 4*a* of semiconductor material, and a structural layer 4*b* of semiconductor material coupled to the substrate 4*a*. The inlet holes 9 are formed through the substrate 4*a*, in particular throughout the thickness of the substrate 4*a*, whereas the structural layer 4*b* is shaped so as to define the size and shape of the chamber 10.

One or more expulsion holes (nozzles) 13 for the fluid 6 are formed in a nozzle plate 8 separate from the first and the second wafers 2, 4, in particular a dry layer (dry-film) coupled to the first wafer 2 at one side of the latter opposite to the side directly facing the second wafer 4. The nozzle 13 is at least partially aligned, in the direction Z, to the outlet channel 33, and, via the latter, is in fluidic connection with the chamber 10.

In one embodiment, the nozzle plate 8 is not a further wafer of semiconductor material, but a layer chosen from the following: a permanent epoxy-based dry-film photoresist, such as TMMF, or a dry-film based upon benzocyclobutene (BCB), or a dry-film of polydimethylsiloxane (PDMS).

In general, the nozzle plate 8 is chosen from a material such as to promote chemical stability to acid or alkaline solutions, organic solvents and other compounds that could be present in the fluid 6 to be ejected. The present applicant has found that TMMF is adapted to various microfluidic applications.

In one embodiment, the nozzle plate 8 has a thickness, measured along Z, of between 5 μm and 100 μm, for example 50 μm.

Figure 9:
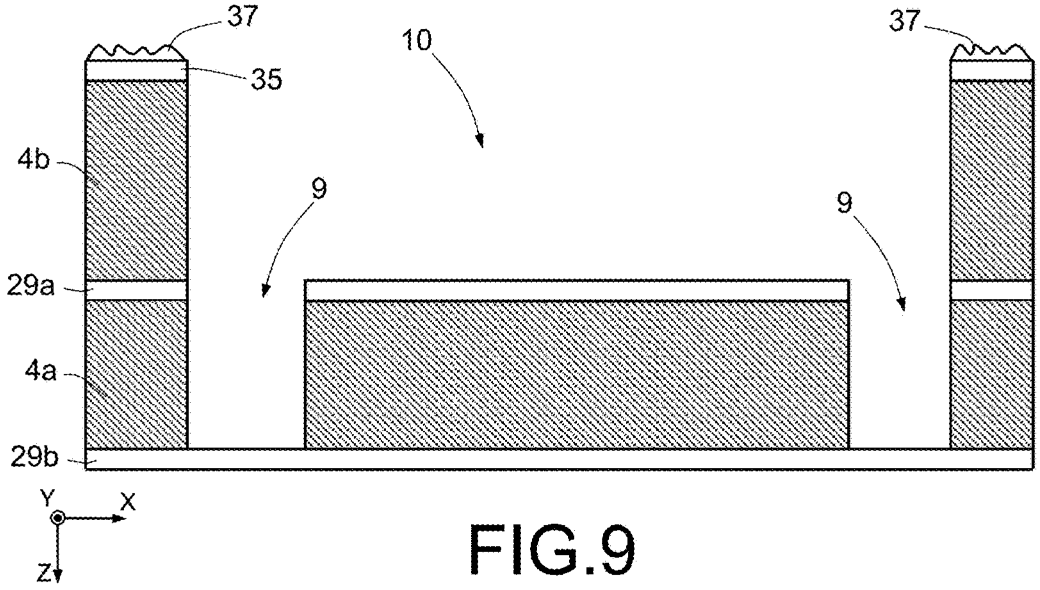

The first and the second wafers 2, 4 are coupled together by means of interface soldering regions, and/or bonding regions, and/or gluing regions, and/or adhesive regions, for example, of polymeric material, generically designated by the references 35, 37 (see also FIG. 9). In particular, the first and the second wafers 2, 4 are coupled so that the piezoelectric actuator 3 extends towards the chamber 10.

Extending between the nozzle plate 8 and the first wafer 2, in particular between the nozzle plate 8 and the membrane 7, is a cavity 23 having a shape and dimensions such as to enable deflection of the membrane 7 towards the nozzle plate 8.

The piezoelectric actuator 3 comprises a piezoelectric region 16 arranged between a top electrode 18 and a bottom electrode 19, adapted to supply an electrical signal to the piezoelectric region 16 for generating, in use, a deflection of the piezoelectric region 16, which, consequently, causes a deflection of the membrane 7. Metal paths extend from the top electrode 18 and from the bottom electrode 19 towards an electrical contact region, provided with contact pads adapted to be biased during use, to activate the actuator 3.

Since the piezoelectric actuator 3 faces the chamber 10, one or more insulation and protection layers cover the piezoelectric actuator 3. In the embodiment illustrated, the insulation and protection layers comprise: a first passivation layer 21*a* (made, for example, of undoped silica glass (USG), or $SiO_2$, or SiN, or some other dielectric material), which extends over the piezoelectric region 16 and over the top electrode 18 and bottom electrode 19, to cover the region 16 completely; a second passivation layer 21*b* (made, for example, of silicon nitride), which extends over the first passivation layer 21*a* to completely cover the latter; and a protection layer 21*c*, which extends over the second passivation layer 21*b* to completely cover the latter.

The protection layer 21*c* is, for example, a dry-epoxy layer (epoxy-based dry-film), of commercially available type, such as TMMR or BCB. The protection layer 21*c* has the function of protecting the piezoelectric actuator and the underlying passivation layers 21*a*, 21*b* from potentially corrosive agents present in the fluid 6 that, in use, is present in the chamber 10.

In one embodiment, the first passivation layer 21*a* has a thickness ranging between 0.1 μm and 0.5 μm and has the function of intermetal insulating dielectric. In one embodiment, the second passivation layer 21*b* has a thickness ranging between 2 μm and 10 μm and has the function of passivation. In one embodiment, the protection layer 21*c* has a thickness ranging between 2 μm and 10 μm and has the function of chemical barrier against the fluid to be ejected.

With reference to FIGS. 2-12, a method is now described for manufacturing the fluid ejection device 1 according to an embodiment of the present disclosure.

In particular, FIGS. 2-6 describe steps for micromachining the first wafer 2, and FIGS. 7-12 describe steps for micromachining the second wafer 4.

Figure 2:
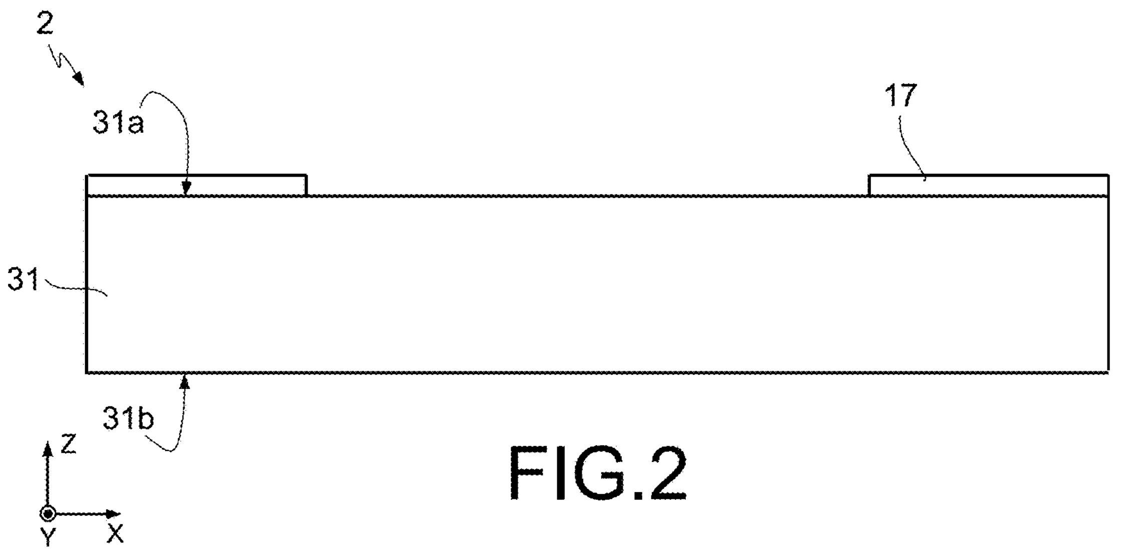
FIGS. 2-12 show steps for manufacturing the fluid ejection device of FIG. 1, according to an embodiment of the present disclosure.
Figure 3:
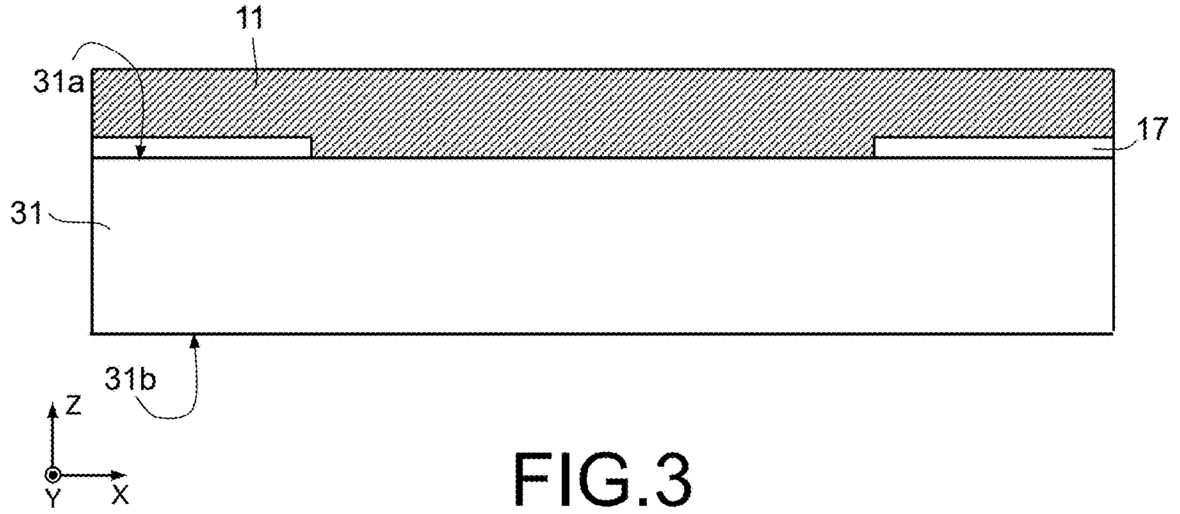

With reference to FIG. 2, the first wafer 2 is arranged, including a substrate 31 of semiconductor material (e.g., silicon) having a front side 31*a* opposite to a back side 31*b*. Next, on the front side 31*a* of the aforesaid substrate a mask layer 17 is formed, made, for example, of TEOS oxide and having a thickness ranging between 0.5 μm and 2 μm, in particular 1 μm. The mask layer 17 is etched and partially removed so as to expose a surface portion of the substrate 31 of the wafer 2 where, in subsequent steps, the cavity 23 described with reference to FIG. 1 will be formed.

This is followed, FIG. 2, by a step of formation of the structural layer 11 on the front side 31*a* of the substrate 31 and of the portions of the mask layer 17 not removed during the previous etching step. The structural layer 11 is, for example, grown epitaxially. In one embodiment, the thickness of the structural layer 11 ranges between 2 μm and 50 μm.

Figure 4:
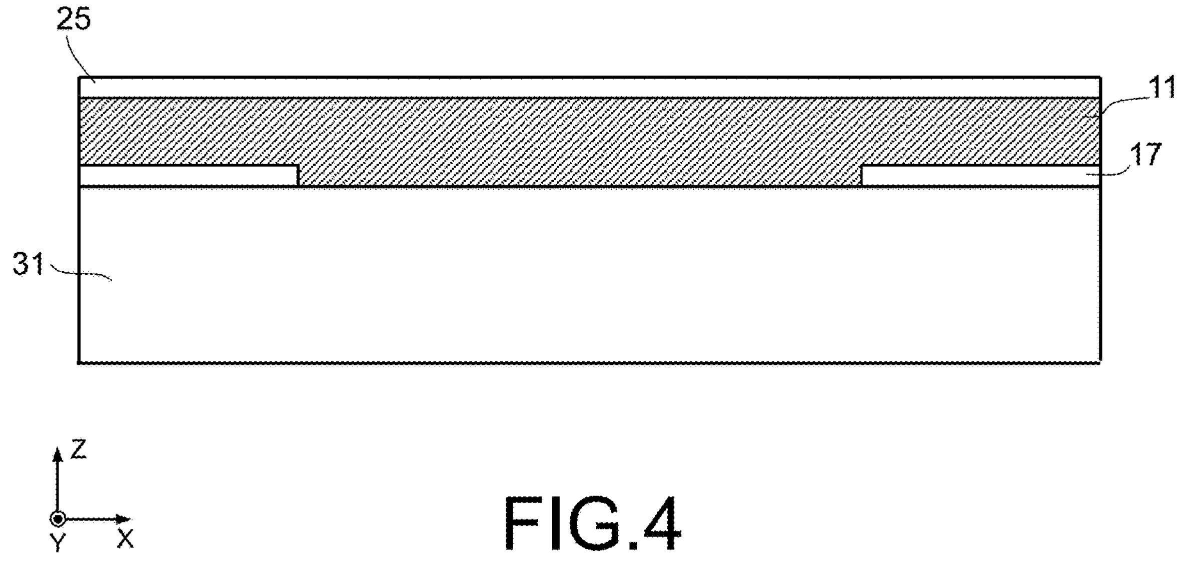
Figure 5:
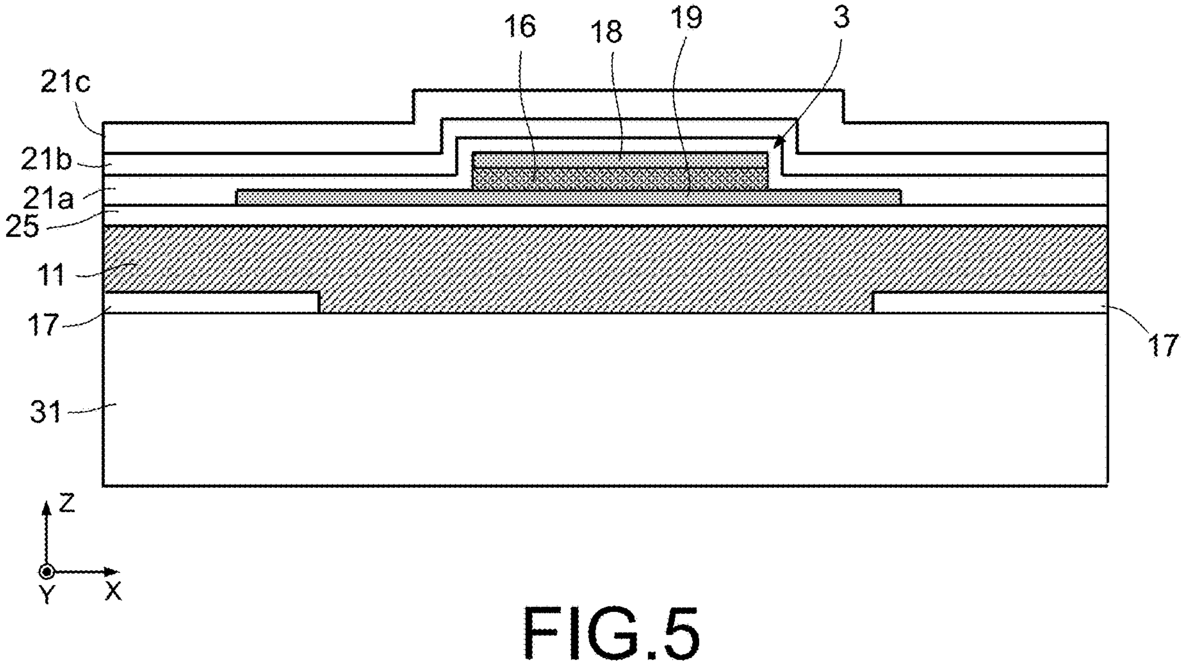

An insulation layer 25, FIG. 4, is then formed, for example made of TEOS oxide and having a thickness ranging between 0.5 μm and 2 μm, in particular 1 μm, on the structural layer 11. The insulation layer 25 has the function of electrically insulating the wafer 2 from the piezoelectric actuator 3, manufactured in subsequent steps.

Formation of the piezoelectric actuator 3 includes a step of formation, on the insulation layer 25, of the bottom electrode 19 (which is formed, for example, by a layer of $TiO_2$ having a thickness of between 5 nm and 50 nm on which a layer of Pt having a thickness ranging between 30 nm and 300 nm is deposited). This is then followed by deposition of a piezoelectric layer on the bottom electrode 19, via deposition of a layer of PZT (Pb, Zr, $TiO_3$), having a thickness ranging between 0.5 μm and 3.0 μm, more typically 1 μm or 2 μm (that will form, after subsequent definition steps, the piezoelectric region 16). Next, deposited on the piezoelectric layer is a second layer of conductive material, for example Pt or Ir or $IrO_2$ or TiW or Ru, having a thickness ranging between 30 nm and 300 nm, to form the top electrode 18.

The electrode and piezoelectric layers are subjected to lithographic and etching steps so as to pattern them according to a desired pattern, thus forming the bottom electrode 19, the piezoelectric region 16, and the top electrode 18.

One or more insulation and protection layers are then deposited on the bottom electrode 19, on the piezoelectric region 16, and on the top electrode 18. The insulation and protection layers include dielectric materials used for electrical insulation/passivation of the electrodes, for example, layers of USG, $SiO_2$, or SiN, or $Al_2O_3$, either single or stacked, having a thickness ranging between 10 nm and 1000 nm.

As described previously, the embodiment illustrated includes sequential formation of a USG layer 21*a*, a SiN layer 21*b* and a dry-epoxy layer 21*c*, such as TMMR.

In one embodiment, the passivation layers are etched and selectively removed for creating trenches for access to the bottom electrode 19 and to the top electrode 18. This is followed by a step of deposition of conductive material within the trenches thus created, and a subsequent patterning step enables formation of conductive paths for selectively accessing the top electrode 18 and the bottom electrode 19 so as to electrically bias them during use. It is moreover possible to form further passivation layers to protect the conductive paths. Conductive pads are likewise formed alongside the piezoelectric actuator, electrically coupled to the conductive paths.

Figure 6:
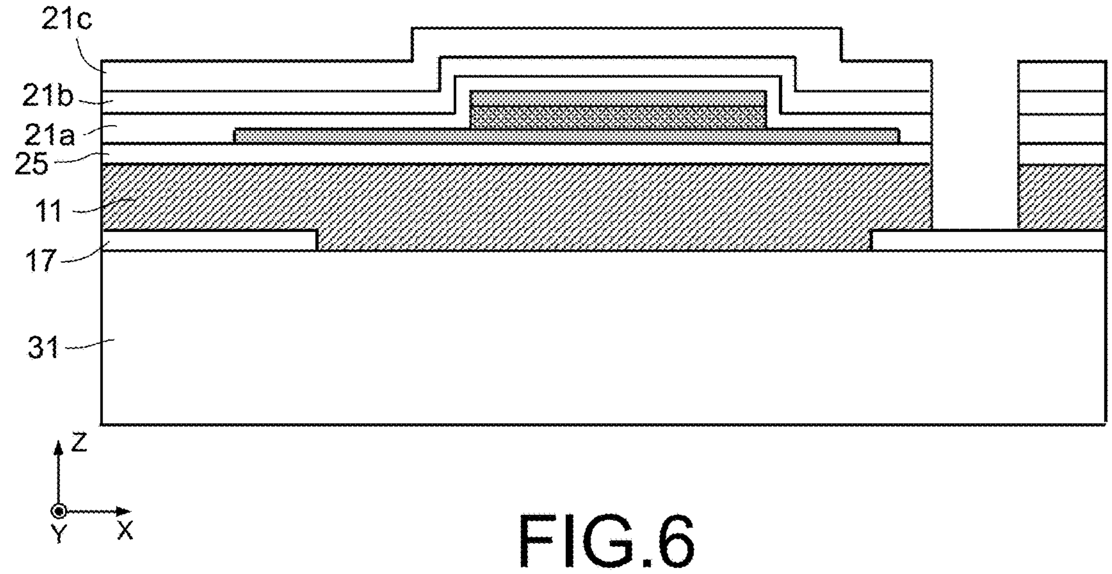

This is followed, FIG. 6, by steps of masked etching of the insulation and protection layers 21*a*-21*c*, of the insulation layer 25, and of the structural layer 11, until the mask layer 17 is reached. This etch is carried out alongside the piezoelectric actuator 3, using a mask shaped so as to expose a region having, in top plan view in the plane XY, a substantially circular shape with a diameter ranging between 10 μm and 200 μm. There is thus formed an outlet channel 33 through part of the first wafer 2; as illustrated in subsequent steps, the outlet channel 33 forms part of a fluidic connection between the chamber 10 and the nozzle 13, for passage of the fluid 6 to be ejected through the nozzle 13.

Figure 7:
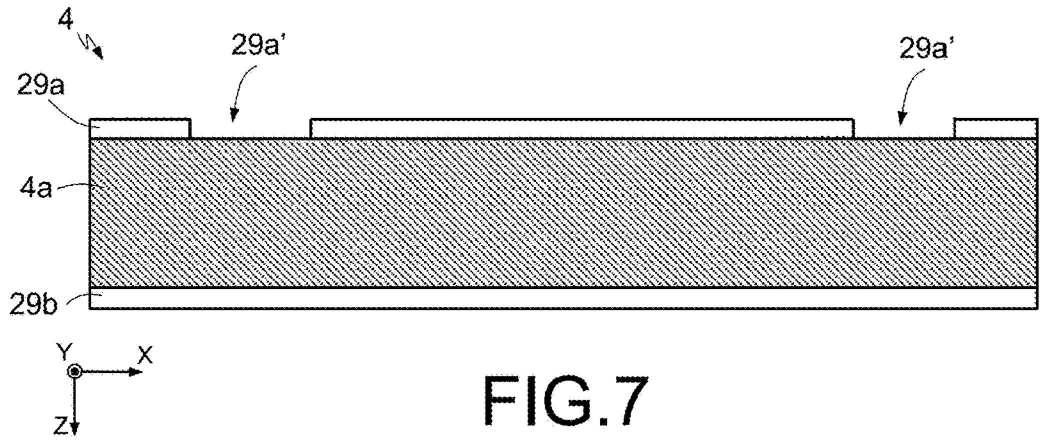

With reference to the second wafer 4, the steps for manufacturing it envisage, FIG. 7, arranging the substrate 4*a* of semiconductor material (e.g., silicon) having a thickness ranging, for example, 400 μm, provided with mask layers 29*a*, 29*b* (made, for example, of TEOS, or $SiO_2$, or SiN having a thickness of 1 μm) on both sides. The mask layer 29*a* is etched with masked etching so as to form openings 29*a*' that define regions of the second wafer 4, formed in which are the inlet holes 9, adapted to supply the fluid 6 to the chamber 10.

Figure 8:
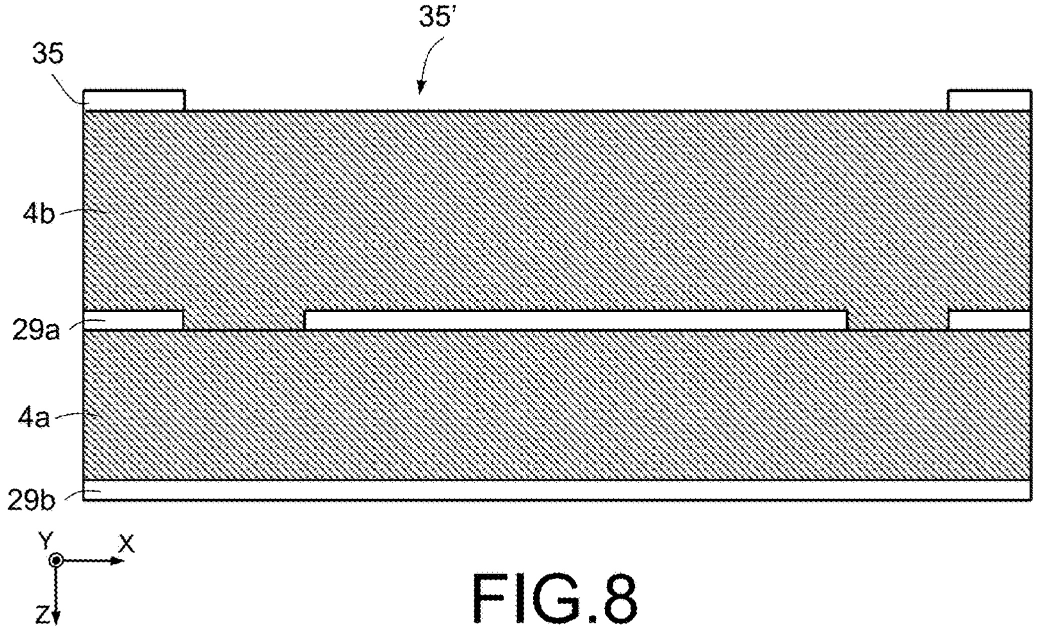

With reference to FIG. 8, formed on a top face of the second wafer 4, i.e., on the mask layer 29*a*, is the structural layer 4*b*, having a thickness ranging between 1 and 20 μm, for example, 4 μm. The structural layer 4*b* is, for example, formed by epitaxial growth. Then a step is carried out of formation of a further mask layer 35 (made, for example, of TEOS, or $SiO_2$, or SiN having a thickness of 1 μm) on the structural layer 4*b*. The mask layer 35 is etched with masked etching so as to form an opening 35' that defines a region of the second wafer 4 in which, in subsequent steps, the chamber 10 will be formed. For this purpose, the opening 35' has an extension, in top plan view in the plane XY, such as to internally contain the openings 29*a*'. Moreover, as may be noted from FIG. 10, the opening 35' likewise has an extension, in top plan view in the plane XY, such as to internally contain both the piezoelectric actuator 3 and the outlet channel 33 of the first wafer 1, when the first and the second wafers 2, 4 are coupled together.

This is followed, FIG. 9, by a step of etching of the wafer 4 using the layers 29*a*, 29*b*, and 35 as etching masks. Selective portions of the substrate 4*a* and of the non-protected structural layer 4*b* are thus removed, to simultaneously form the inlet holes 9 and the chamber 10. A coupling layer 37, for example, of glue, is deposited on the mask layer 35.

Figure 10:
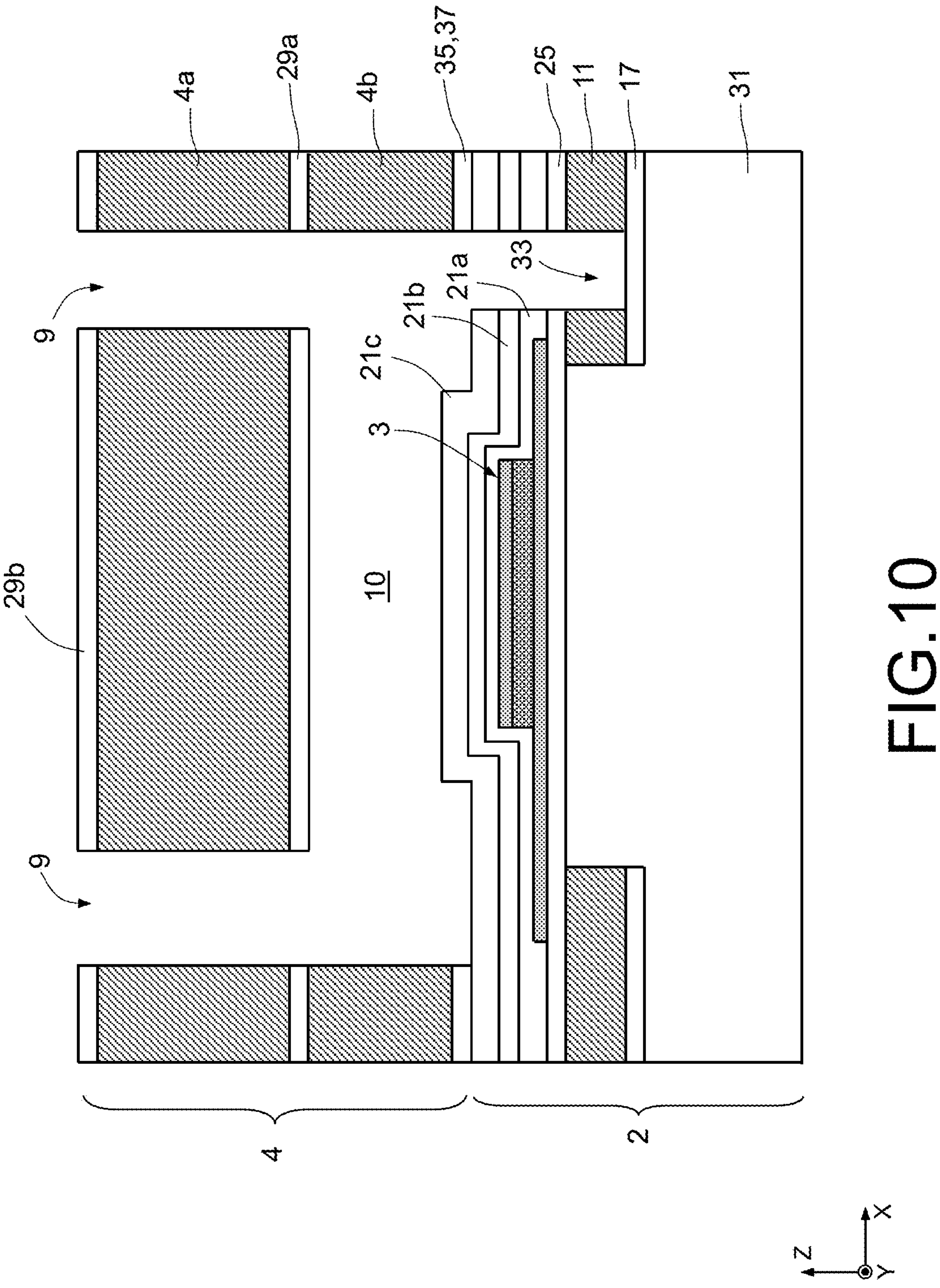
Figure 11:
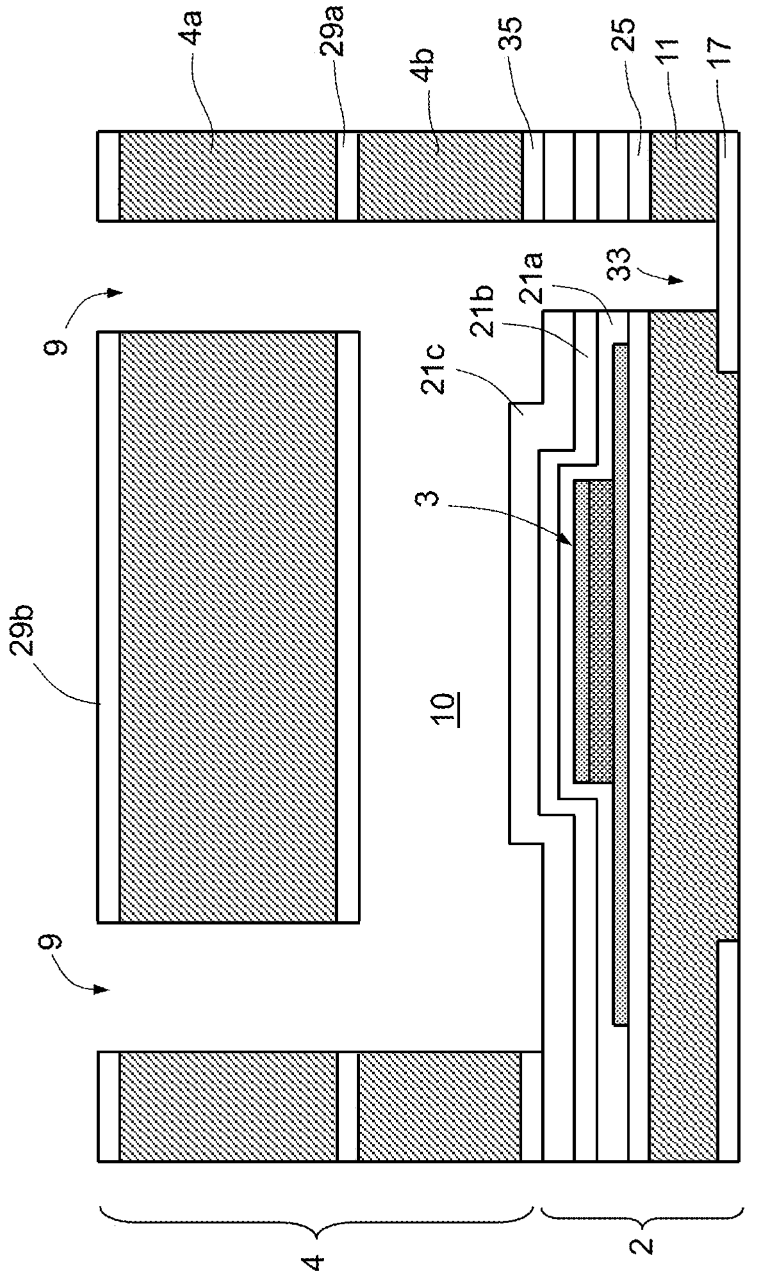

This is then followed, FIG. 10, by a step of coupling between the first and the second wafers 2, 4 via gluing of the mask layer 35 to the protection layer 21*c* of the first wafer 2, via the coupling layer 37. More in particular, coupling between the wafers 2 and 4 is carried out using the wafer-to-wafer bonding technique and so that the chamber 10 completely houses the piezoelectric actuator 3 and so that the outlet channel 33 is in fluidic connection with the inlet hole 9 via the chamber 10. There is thus obtained a stack of the two wafers 2, 4. It is noted that other techniques to couple the first and the second wafers 2, 4 together may also be used.

Machining steps are then carried out at the back side 31*b* of the substrate 31 of the first wafer 2. In particular, FIG. 11, the substrate 31 is subjected to a step of, for example, chemical mechanical polishing (CMP) for reducing the thickness thereof. More in particular, the substrate 31 is completely removed.

Figure 12:
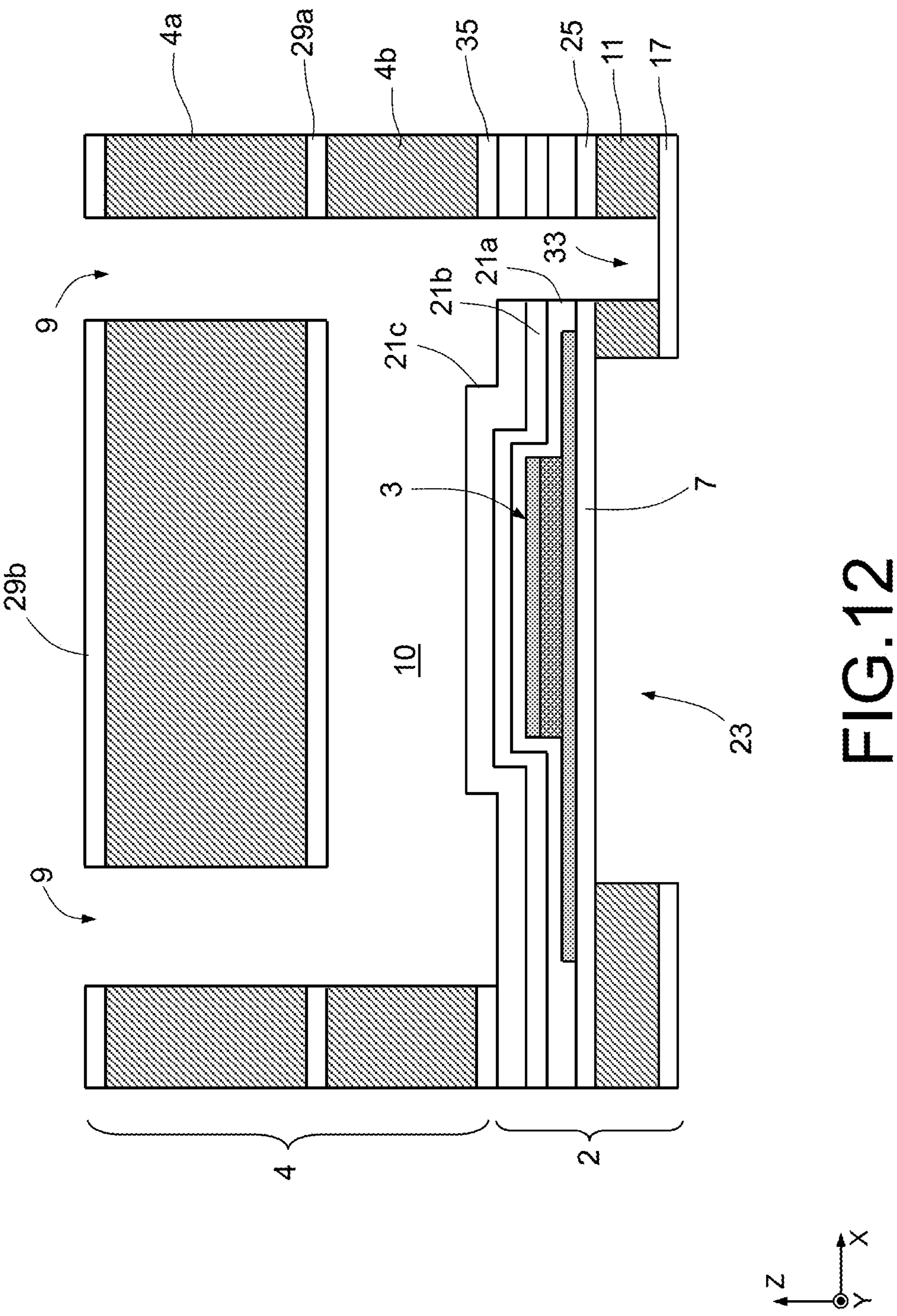

Then, FIG. 12, the mask layer 17 is used for carrying out etching of the structural layer 11, which is removed throughout the entire thickness, where it is not protected by the mask layer 17, until the insulation layer 25 is reached and the cavity 23 is formed. The membrane 7, suspended over the cavity 23, is simultaneously formed.

Finally, a step of coupling the nozzle plate 8 to the mask layer 17 is carried out, by, for example, laminating a film of TMMF, which seals the cavity 23. In a step prior or subsequent to coupling of the nozzle plate 8 to the mask layer 17, the nozzle 13 is obtained by making a through-hole through the nozzle plate 8 in a region thereof such that, when coupled to the mask layer 17, it is vertically aligned (in the direction Z) with the outlet channel 33. A further step of selective etching of the portion of the mask layer 17 exposed through the nozzle 13 makes it possible to set the nozzle 13 in fluidic connection with the outlet channel 33.

Alternatively to what has been described above, it is likewise possible, using a mask obtained for this purpose, to etch the portion of the mask layer 17 at the channel 33 prior to the step of coupling the nozzle plate 8 to the mask layer 17.

The ejection device 1 of FIG. 1 is thus obtained.

Figure 13:
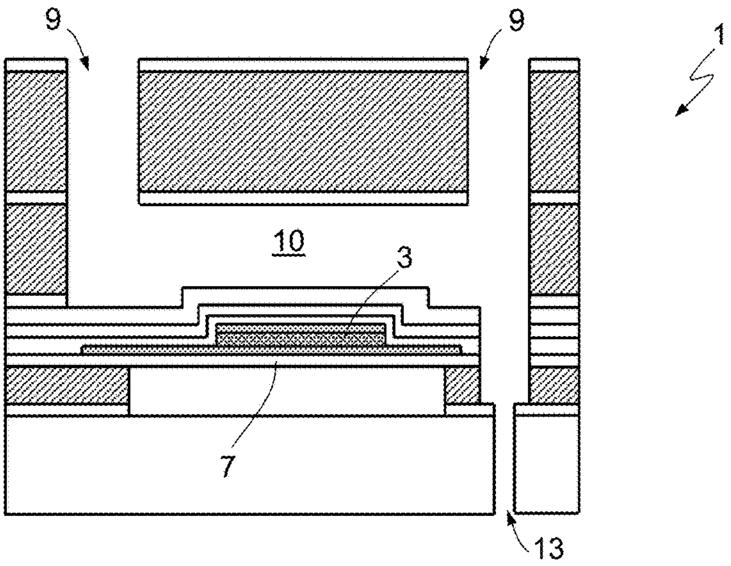
FIGS. 13-15 show the fluid ejection device manufactured according to the steps of FIGS. 2-12 during respective operating steps.
Figure 14:
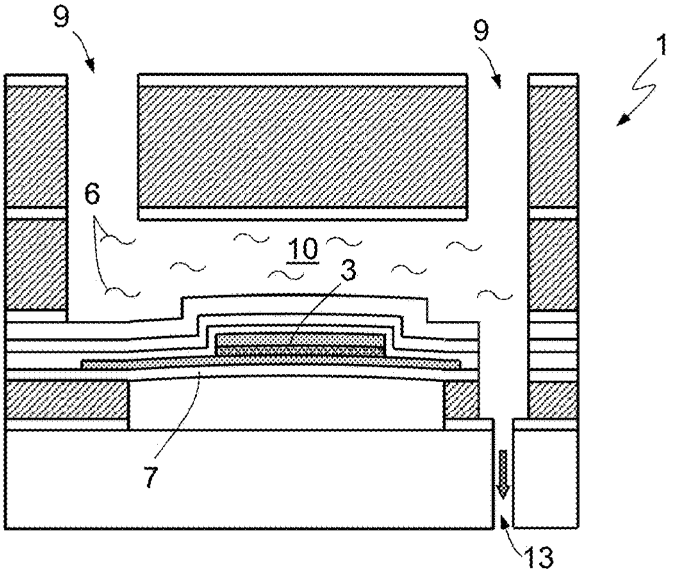
Figure 15:
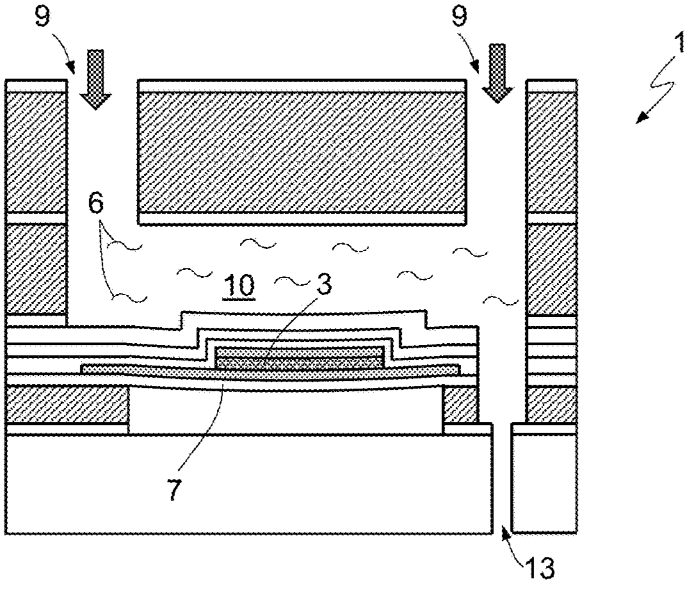

FIGS. 13-15 show the fluid ejection device 1 in operating steps, during use.

In a first step, FIG. 13, the chamber 10 is filled with the fluid 6 is to be ejected. This step of loading of the fluid 6 is carried out through the inlet channels 9.

Then, FIG. 14, the piezoelectric actuator 3 is controlled through the top electrode 18 and the bottom electrode 19 (appropriately biased) so as to generate a deflection of the membrane 7 towards the inside of the chamber 10. This deflection causes a movement of the fluid 6 through the channel 33, towards the nozzle 13, and generates controlled expulsion of a drop of fluid 6 towards the outside of the fluid ejection device 1.

Next, FIG. 15, the piezoelectric actuator 3 is controlled through the top electrode 18 and the bottom electrode 19 so as to generate a deflection of the membrane 7 in a direction opposite to what is illustrated in FIG. 14, so as to increase the volume of the chamber 10, recalling further fluid 6 towards the chamber 10 through the inlet channels 9. The chamber 10 is hence recharged with fluid 6. It is thus possible to proceed cyclically by driving the piezoelectric actuator 3 for expulsion of further drops of fluid. The steps of FIGS. 14 and 15 are repeated throughout the entire printing process.

Figure 16:
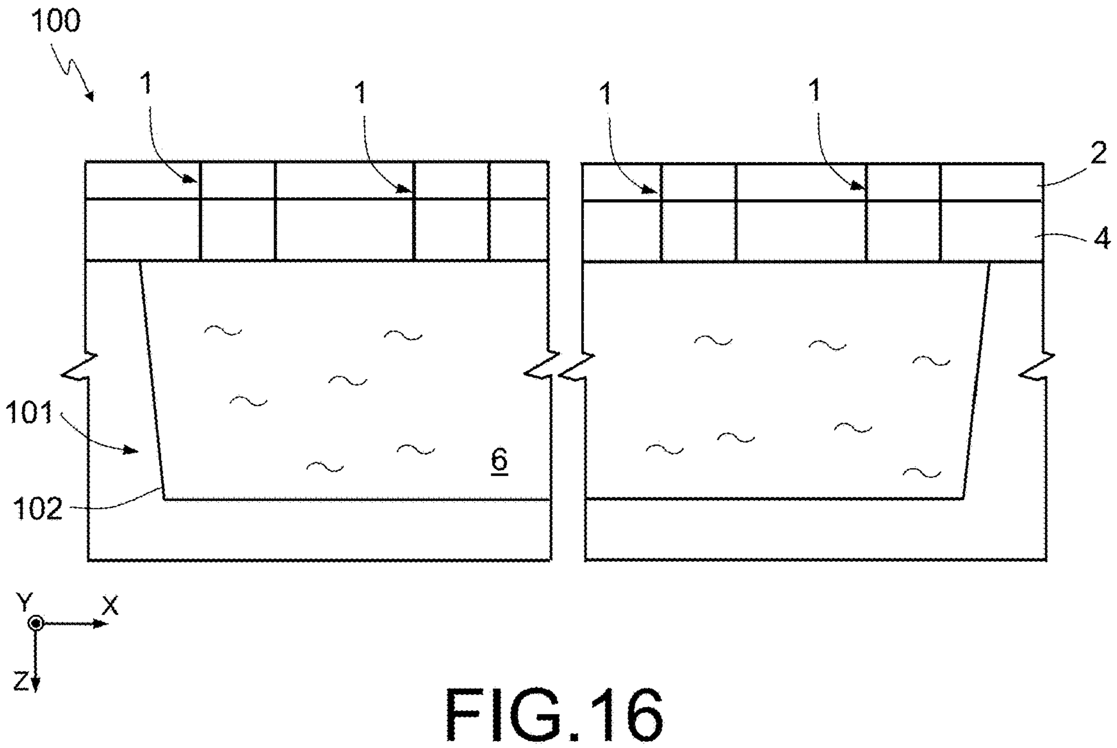
FIG. 16 shows a printhead comprising the ejection device of FIG. 1.

FIG. 16 is a schematic illustration of a printhead 100 comprising a plurality of ejection devices 1 formed as described previously and illustrated in FIG. 16 schematically.

The printhead 100 may be used not only for ink-jet printing, but also for applications such as high-precision deposition of liquid solutions containing, for example, organic material, or generally in the field of deposition techniques of an inkjet-printing type, for selective deposition of materials in the liquid phase.

The printhead 100 further comprises a reservoir 101, arranged underneath the ejection devices 1, adapted to contain in an internal housing 102 of its own the fluid 6 (for example ink).

Further interfaces (e.g., a manifold) between the reservoir 101 and the ejection devices 1 may be present for fluidically coupling the reservoir 101 to the one or more inlet holes 9 of each ejection device 1.

Figure 17:
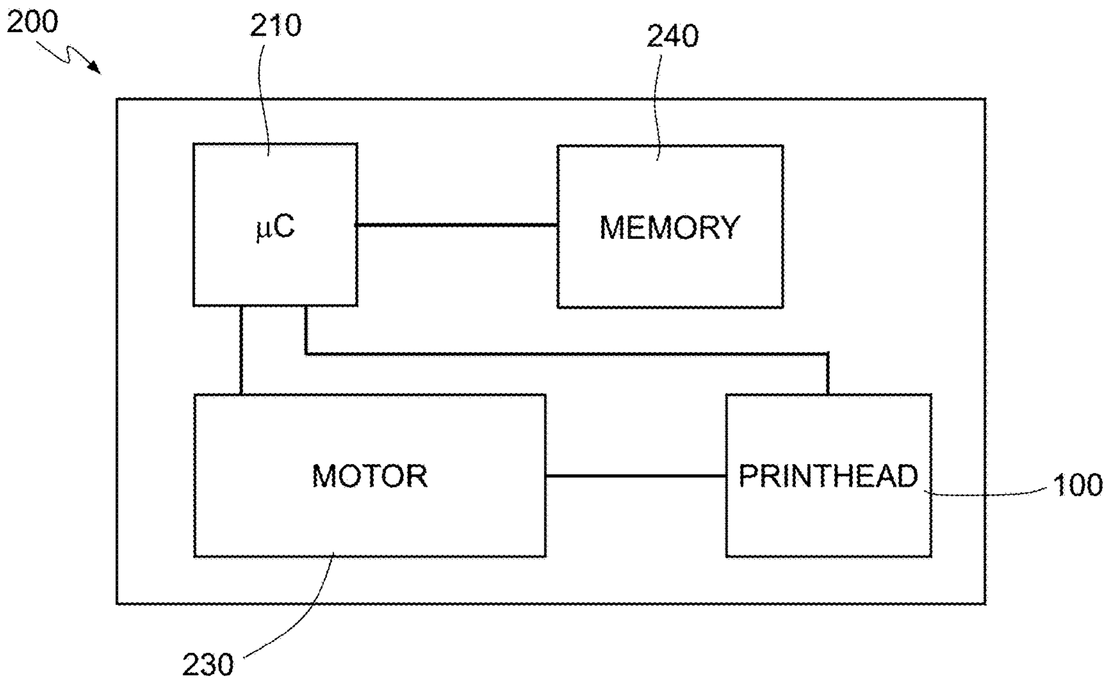
FIG. 17 shows a block diagram of a printer comprising the printhead of FIG. 16.

The printhead 100 may be incorporated in any type of printer. FIG. 17 shows a block diagram of a printer comprising the printhead of FIG. 16.

The printer 200 of FIG. 17 comprises a microprocessor 210, a memory 220 connected to the microprocessor 210, a printhead 100 including a plurality of ejection devices 1 according to an embodiment of the present disclosure (e.g., of the type shown in FIG. 16), and a motor 230 for moving the printhead 100. The microprocessor 210 is connected to the printhead 100 and to the motor 230, and is configured to co-ordinate movement of the printhead 100 (obtained by running the motor 230) and ejection of the liquid (for example, ink) from the printhead 100. The operation of ejection of liquid is obtained by controlling operation of the piezoelectric actuator 3 of each ejection device 1, as illustrated in FIGS. 13-15.

From an examination of the characteristics of the various embodiments of the present disclosure, the advantages that the various embodiments afford are evident.

For example, it may be noted that the steps for manufacturing the fluid ejection device according to the present disclosure entail coupling of just two wafers, thus reducing the risks of misalignment, limiting the manufacturing costs, and rendering the final device structurally more solid.

In fact, an error committed during the steps of gluing of a number of wafers is difficult to recover, and there may be noted an effect of error accumulation in the formation of a stack of wafers, which rapidly leads to a final device does not function properly. Moreover, it may be noted that mechanical bonding, normally used for coupling wafers, enables a precision of alignment of some micrometers to be achieved, typically more than 5 μm; instead, machining steps that envisage photolithographic steps enable a level of precision of below 0.5 μm to be achieved and are consequently advantageous.

Finally, it is clear that modifications and variations may be made to what has been described and illustrated herein, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

forming, on a first side of a first wafer including semiconductor material, a piezoelectric actuator;

forming, in the first wafer and lateral to the piezoelectric actuator, an outlet channel;

forming a second wafer on the first wafer, the second wafer including semiconductor material, a recess, and at least one inlet channel fluidically coupled to the recess, the piezoelectric actuator being in the recess, the recess forming a reservoir configured to hold fluid;

forming a nozzle plate on a second side, opposite to the first side, of the first wafer; and forming an ejection nozzle, at least partially aligned with the outlet channel, through the nozzle plate such that the ejection nozzle is fluidically coupled to the recess through the outlet channel.

2. The method according to claim 1, further comprising:

forming a multilayer stack on the piezoelectric actuator and laterally to the piezoelectric actuator, the multilayer stack configured to insulate and protect the piezoelectric actuator from the fluid when the fluid is in the reservoir, the second wafer being coupled to portions of the multilayer stack that are lateral to the piezoelectric actuator.

3. The method according to claim 2, wherein the forming of the outlet channel includes removing selective portions of the multilayer stack that are lateral to the piezoelectric actuator.

4. The method according to claim 1, further comprising:

forming, on the second side of the first wafer, a hard mask;

forming an opening in the hard mask;

forming, on the hard mask, a structural layer;

forming, on the structural layer, an electrical-insulation layer;

forming, on the electrical-insulation layer, the piezoelectric actuator;

forming a membrane by removing selective portions of the structural layer through the opening in the hard mask until said electrical-insulation layer is reached, the piezoelectric actuator configured to control a deflection of the membrane.

5. The method according to claim 1, wherein the forming of the nozzle plate on the second side includes laminating a permanent epoxy-based dry-film photoresist.

6. A method, comprising:

forming a first multilayer structure including an outlet channel;

forming an actuator on the first multilayer structure;

forming a second multilayer structure on the first multilayer structure, the first multilayer structure and the second multilayer structure forming a chamber configured to hold a fluid, the actuator being positioned in the chamber, the second multilayer structure including an inlet channel; and forming a nozzle plate on the first multilayer structure, the nozzle plate and the second multilayer structure being on opposite sides of the first multilayer structure, a nozzle of the nozzle plate being fluidically coupled to the outlet channel.

7. The method according to claim 6 wherein forming the first multilayer structure includes:

forming a cavity; and forming a membrane between the cavity and the actuator.

8. The method according to claim 7 wherein the actuator is configured to move the membrane towards the chamber and towards cavity.

9. The method according to claim 6 wherein the outlet channel and the inlet channel are fluidically coupled to each other by the chamber.

10. The method according to claim 6 wherein forming the second multilayer structure includes aligning the outlet channel and the inlet channel with each other.

11. The method according to claim 6, further comprising:

forming a protective layer on the actuator, the second multilayer structure being spaced from the first multilayer structure by the protective layer.

12. The method according to claim 11 wherein forming the protecting layer includes forming a plurality of passivation layers.

13. The method according to claim 6 wherein forming the second multilayer structure on the first multilayer structure includes:

forming a recess in the second multilayer structure; and coupling the second multilayer structure to the first multilayer structure, the recess forming the chamber.

14. The method according to claim 6 wherein the actuator includes:

a first electrode on the first multilayer structure;
piezoelectric on the first electrode; and
a second electrode on the piezoelectric.

15. The method according to claim 1 wherein forming the second wafer on the first wafer includes coupling the second wafer to the first wafer.

16. A method comprising:

forming a first multilayer structure including a membrane and a cavity;

forming an actuator on the membrane, the actuator configured to move the membrane towards and away from the cavity;

forming a second multilayer structure on the first multilayer structure, a chamber being formed by the first multilayer structure and the second multilayer structure, the actuator being positioned in the chamber; and forming a nozzle plate on the first multilayer structure, the nozzle plate and the second multilayer structure being on opposite sides of the first multilayer structure.

17. The method according to claim 16 wherein the nozzle plate is spaced from the membrane by the cavity.

18. The method according to claim 16 wherein the first multilayer structure includes an outlet channel extending through the first multilayer structure, the second multilayer structure includes an inlet channel extending through the second multilayer structure, and the chamber, the outlet channel, the inlet channel, and the chamber are fluidically coupled to each other.

19. The method according to claim 16 wherein forming the first multilayer structure includes forming a protective layer on the actuator.

20. The method according to claim 16 wherein forming the second multilayer structure on the first multilayer structure includes:

forming a recess in the second multilayer structure; and coupling the second multilayer structure to the first multilayer structure, the recess forming the chamber.

* * * * *